United States Patent Office 3,420,630
Patented Jan. 7, 1969

3,420,630
PROCESS FOR THE SYNTHETIC PRODUCTION
OF AMMONIA
Wilhelm Friedrich Braun, Haldenrain 6,
Lucerne Switzerland
Filed Apr. 21, 1967, Ser. No. 632,753
Claims priority, application Switzerland, Apr. 25, 1966,
6,007/66
U.S. Cl. 23—198      4 Claims
Int. Cl. C01c 1/04

ABSTRACT OF THE DISCLOSURE

In a process for the synthetic production of ammonia, a circulating gas stream passes through a reactor chamber having catalyst layers, the stream being broken up so that a portion passes to the beginning of the layers and other portions pass respectively between the layers. The stream of gas passing to the reactor chamber is pre-heated by being brought into heat exchange relation with the gas from the reaction chamber. A heat exchanger in one part of the reaction chamber removes heat from the gas as it passes from it.

BACKGROUND OF THE INVENTION

Catalysts for the synthesis of ammonia are effective between two critical temperatures:

(a) The minimum temperature (starting temperature) of the circulating gas of synthesis, which must be present on entrance into the catalyst chamber in order to initiate the reaction, and (b) the maximum temperature (decomposition temperature) with which the catalyst loses its mechanical firmness, would decompose excessively and would block the catalyst chamber for the passage of the gas.

There are known numerous technical solutions to hold the temperature of the circulating gas within the range between the critical temperatures. As examples, there can be mentioned:

(1) A heat exchange device such as pipes, is installed in the catalyst chamber. The catalyst is found outside the heat exchange pipes and falls to the heat of the reaction, which is furnished internally. Inside the pipes the circulating gas is pre-heated before its entrance into the catalyst chamber to the point where the starting temperature is reached. The course of the temperature in the catalyst chamber is determined by the size of the exchange surfaces and their flow of heat. An influence from outside is not possible. The exit temperature is relatively low.

(2) The chamber filled with catalyst (full chamber oven) has some fixed installed cold gas feeds. They are provided in heights in which the temperature of the gas from experience approaches the upper critical temperature. Through the addition of cold gas (according to climate between 20° and 50° C.), the temperature is lowered again, without, however, reaching below the lower critical temperature. There is possible an influence from outside for the pre-selected point of the feeding. The exit temperature is relatively high, but it is conformingly lowered with the exchange of heat with the incoming circulating gas, which must be pre-heated to the starting temperature.

The tendency lately with the synthetic production of ammonia is to produce larger and consequently more economical units, to keep this, with regard to the energy balance, as economically self-sufficient as possible, and to extend the life-span of the catalyst and with this the continuous working period of the unit. The life-span of the catalyst is limited by contamination, which is brought into the synthesis circulation with the fresh gas. It gradually contaminates the catalyst layers on entry into the catalyst chamber, thus with variant (example 1) only the top layer, and with variant Example 2) the top layer and, to a lesser degree, the layers following after the cold gas fee.

Contaminated catalyst layers require a higher starting temperature. The heat exchange for the entering gas must be provided for the maximum starting temperature. The regulation to a lower temperature results from the addition of cold gas. In spite of raising the entry temperature, the formation of the ammonia is slowed down at this point. The catalyst must be exchanged when the desired quantity of ammonia can no longer be reached. At this point in time, only a relatively small layer of catalyst is contaminated and in effect useless.

With the energy balance of the ammonia synthesis and with the accompanying production of synthesis gas, the chief expenditure lies in the compression of the synthesis gas (for example from 25 to 300 atm.), which today, with large units, results mainly through turbo compressors with steam turbine drive. The exothermic processes must produce as much exhaust steam as possible, in order to cover this need. For the synthesis hereto are chiefly known:

(x) The introduction of vaporization pipes between individual catalyst layers with the full chamber oven.

(y) The insertion of an exhaust heat boiler in the flow of circulating gas after the catalyst chamber or after exit from the reactor.

With both variants the production of steam is limited by the fact that above all the entering gas must be heated up to the starting temperature by the exiting circulating gas.

SUMMARY

The process according to the invention for the synthetic production of ammonia is characterized by the fact that to that portion of the whole quantity of circulating gas which is led to the top layer of catalyst, there is added, on entry in the catalyst chamber and/or at a place or at several places between the individual catalyst layers, a considerable remaining portion which, by heat exchange in the catalyst chamber or with the circulating gas exiting from the reactor, after this has passed an exhaust heat boiler, has been pre-heated to a temperature which is lower than the exit temperature of the circulating gas out of the exhaust heat boiler, or after the exchange with vaporization pipes.

It has been shown that for example a circulating gas with an $NH_3$ content of 4% before entry into the catalyst and of 16% at exit-under operating conditions which are fixed in other respects—is heated approximately 180° C. by the heat of the reaction. Cold gas of 40° C. would be heated to 220° C., warm gas of 180° C. to 360° C. If the reaction is to result with 500° C., additional amounts of heat must be available from the not yet completely expired reaction of the main quantity of gas, so that the added gas also reaches the temperature of the reaction. These amounts of heat must be sufficient for a temperature increase of 280° C. with cold gas and of 140° C. with warm gas. If the addable quantities of heat in both cases are equally large, that is, if at the point of the addition, the $NH_3$ content is equally high, the amount of warm gas supplied can be twice as large as an amount of added cold gas. In practice this proportion is not completely reached.

The exit temperature from the reaction chamber is determined by the heat of the reaction and by the perceptible heat in the introduced circulating gas. By the addition of warm gas, the quantity of heat led to the gas at a low temperature level is brought to a high temperature level by means of the heat of the reaction. The addition of warm gas is not only possible with the full chamber oven (Example 1), but also with a catalyst chamber with heat exchange (Example 2). It is likewise feasible with a combination of both types with which, for example, the upper part of the catalyst chamber exhibits a heat exchanger, while the lower part is filled only with catalyst.

The addition of warm gas between the catalyst layers reduces the amount of circulating gas at entrance and therewith the contamination of the top catalyst layer. The addition of the warm gas between the individual layers results with a higher temperature than at the entrance, so that a contamination of the catalyst layer following thereto cannot take effect in the same way.

The advantages of the process according to the invention are that the contamination of the top catalyst layer is reduced in proportion to the amout of circulating gas fed it, and the duration of a filling of catalyst, and with it the continuous operating period, are extended. The starting temperature is lowered with less contaminated catalyst, and heat consumption and exchange surfaces for the reaching of the starting temperature are likewise smaller. The heat balance produces through the supplying of additional perceptible heat in the warm gas, an excess of heat within the required temperature range, which can be used for the production of a larger amount of exhaust steam.

DESCRIPTION OF THE PREFERRED EMBODIMENT

Figure 1:
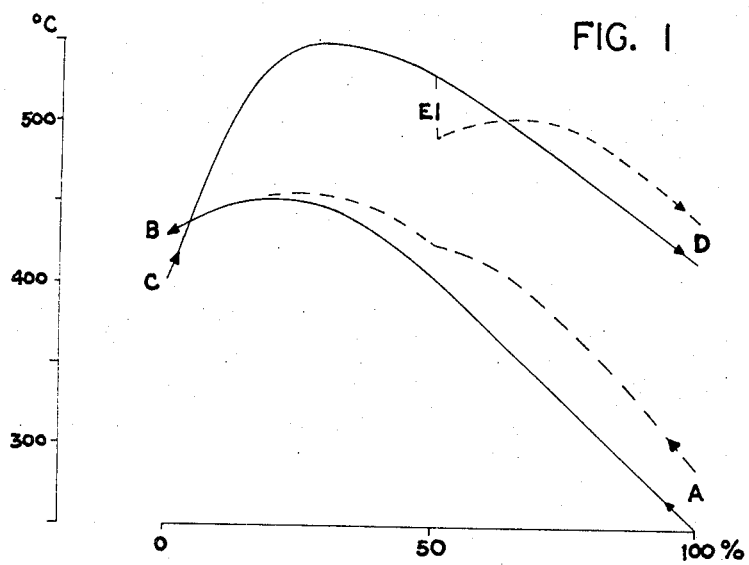
FIGURE 1 is a diagram showing the approximate course of temperature over the height of the catalyst filling as abscissa in a catalyst chamber with a heat exchanger, the full line curves indicating known processes and the broken lines being in accordance with this invention, all quantity data referring to the production of a metric ton (2,205 pounds) of ammonia.

Referring to FIGURE 1, A designates the circulating gas entering the pipes of the heat exchanger. It is warmed up to the maximum starting temperature B. So long as this is not necessary, the temperature is lowered by the addition of cold or warm gas to C. The reaction then setting in raises the temperature, wherewith the heat removal provides that the maximum temperature is not reached and the temperature of the gas on exit from the catalyst chamber D is essentially lowered.

With addition of warm gas the temperature A is higher. Nevertheless the heat content is lower, because the amount of gas is smaller. The addition of warm gas results with B and with E. The exit temperature is higher. The heat balance thus shows savings with the pre-heating of the entering gas and a surplus with the exciting gas of higher temperature. The additional yield in exhaust heat amounts to approximately 180 Kcal. and corresponds to an additional production of exhaust heat steam of over 0.3 t. steam/t. $NH_3$.

The amount of gas added to the top catalyst layer amounts to approximately 84% as regards the usual operating methods. With this the contamination of this layer is lowered about 16%. The maximum starting temperature is lowered and the operating period of the catalyst filling is correspondingly extended.

Figure 2:
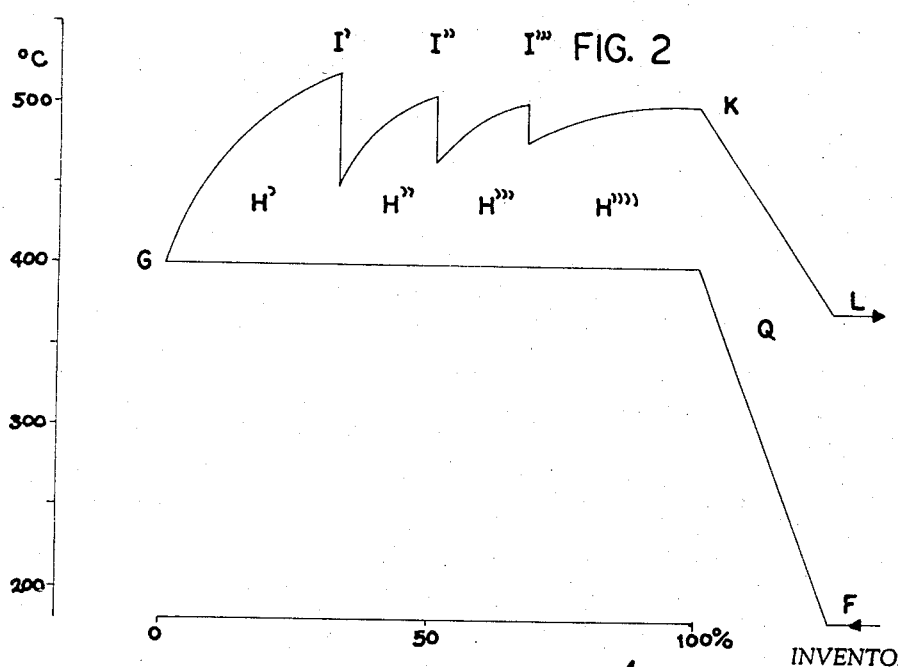
FIGURE 2 is a diagram showing the temperature course in a full chamber oven and in the heat exchanger for the pre-heating of the entering circulating gas.

FIGURE 2 shows a temperature course in a full chamber oven and in the heat exchanger Q for the pre-heating of the entering circulating gas. Warm gas F is pre-heated approximately 53% to the starting temperature G, added approximately 47% between the catalyst layers $H^1$, $H^{11}$, $H^{111}$, and $H^{1111}$. The addition results in three part flows $I^1$, $I^{11}$ and $I^{111}$. At the same time it lowers the temperature as well as the $NH_3$ content. The temperature K of 500° C. on exit from the catalyst room is lowered to L (approximately 383° C.) by the pre-heating of the entering circulating gas.

The heat content of the exiting circulating gas is sufficient for the production of approximately 1.1 t. exhaust steam (15 atü.) and for the production of warm gas. With the classic method of the addition of cold gas approximately 71% must be pre-heated and with equal temperature with the K temeprature L would be essentially lower. Its height depends besides on the temperature of the gas entering at F. If this likewise is supplied with 180° C., the exhaust steam production with warm gas addition is approximately 36% higher; in the case that cold gas is supplied with 40° C., the steam extraction (as regards warm gas addition) amounts to only approximately 10%, with which equal steam pressure has been received.

The amount of gas added to the top catalyst layer— as regards the cold gas addition—amounts to approximately 75%. The contamination is reduced 25% and with this the starting temperature is reduced and the operating time is extended.

Figure 3:
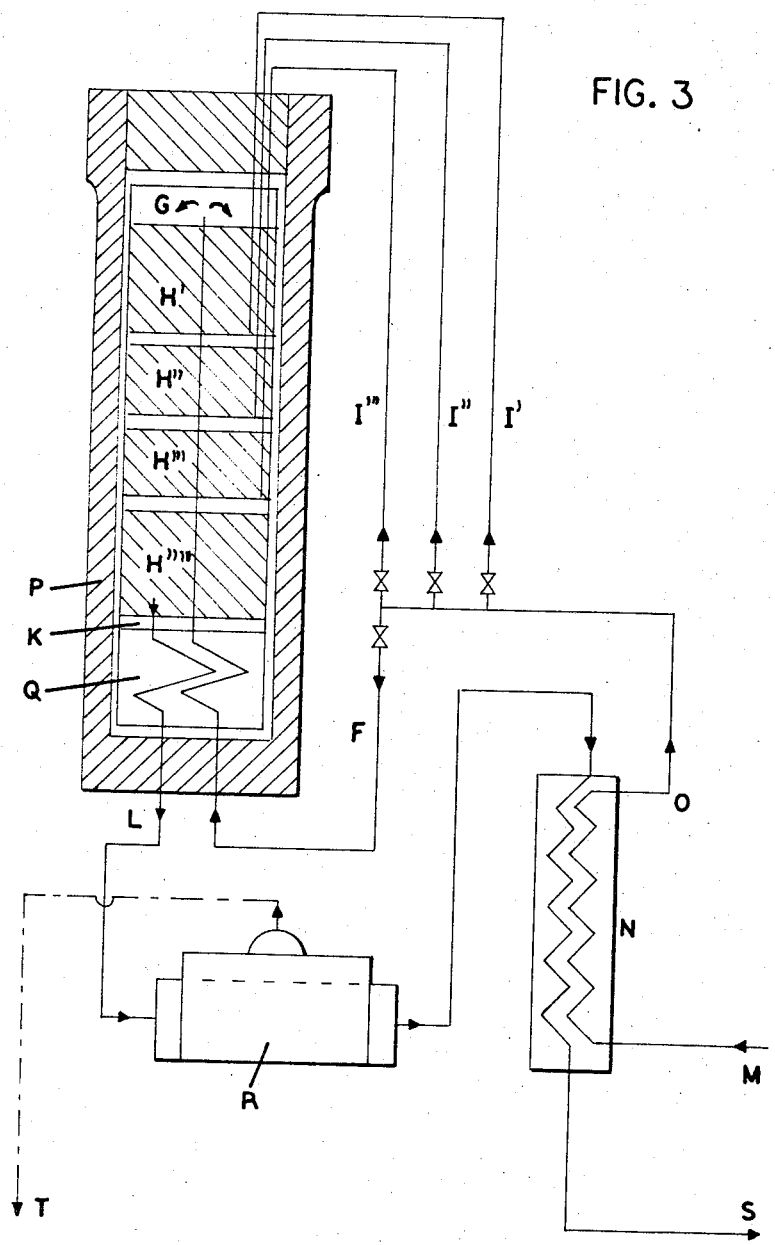
FIGURE 3 is a schematic view partly in section of an apparatus for practicing the process for a full chamber oven according to FIGURE 2.

FIGURE 3 shows all apparatus pertaining to the process according to the invention for a full chamber oven according to FIGURE 2. The elements such as reactor, heat exchanger and exhaust heat boiler are known. These elements' insertion or arrangement, pertaining to the process according to the invention is new. Circulating gas M coming from the production of $NH_3$ is heated in a heat exchanger N to warm gas temperature O. A part flow F is led to a reactor P, heated in a heat exchanger Q and is led to the top catalyst layer $H^1$. Three part flows $I^1$, $I^{11}$ and $I^{111}$ are added beyond the respective catalyst layers. The now complete amount of circulating gas, after exit from the lower catalyst layer $H^{1111}$, is cooled down in the heat exchanger Q and leaves the reactor P. Further temperature reductions result in an exhaust heat-steam boiler R and in the heat exchanger N. The gas S exiting here goes to the precipitation of the produced ammonia. The steam produced in the boiler R is available at T. In the heat exchanger N there must be present a temperature difference between entering and exiting gas. The temperature of the warm gas accordingly is under the exit temperature of the circulating gas from the exhaust heat boiler R.

What I claim is:
1. In a process for the synthetic production of ammonia, wherein a stream of circulating gas is passed through a reaction chamber containing a catalyst and wherein said circulating gas is preheated upon entry into said reaction chamber by heat-exchange with circulating gas exiting from said reaction chamber, the improvement which comprises disposing said catalyst in layers within said reaction chamber, producing exhaust steam from said exiting gas before said exiting gas is heat-exchanged with said entering gas, dividing said preheated entering gas into several gas streams, and introducing one of the said gas streams into the top of the uppermost catalyst layer and each of the other of said gas streams into the top of each of the individual layers of said catalyst.

2. The process of claim 1, wherein said gas stream introduced into said uppermost catalyst layer is additionally preheated by heat-exchange with said exiting gas prior to the production of exhaust steam from said exiting gas.

3. The process of claim 2, wherein said heat-exchange prior to said exhaust steam production is conducted within said reaction chamber.

4. The process of claim 2, wherein said heat-exchange prior to said exhaust steam production is conducted immediately after said exiting gas leaves the lowermost catalyst layer within said reaction chamber.

References Cited

UNITED STATES PATENTS

| Re. 19,243 | 7/1934 | Richardson | 23—199 |
| 1,507,560 | 9/1924 | Arnold et al. | 23—199 |
| 1,507,560 | 9/1924 | Arnold et al. | 23—199 |
| 1,794,231 | 2/1931 | Humphrey | 23—198 |

EARL C. THOMAS, *Primary Examiner.*

H. S. MILLER, *Assistant Examiner.*

U.S. Cl. X.R.

23—288